United States Patent [19]

Kobayashi et al.

[11] 4,293,275

[45] Oct. 6, 1981

[54] GAS TURBINE BLADE COOLING STRUCTURE

[75] Inventors: Nariyoshi Kobayashi, Ibaraki; Takeshi Sakamoto, Tokai; Shunichi Anzai; Manabu Matsumoto, both of Ibaraki, all of Japan

[73] Assignee: Hitachi, Ltd., Tokyo, Japan

[21] Appl. No.: 75,584

[22] Filed: Sep. 14, 1979

[30] Foreign Application Priority Data

Sep. 14, 1978 [JP] Japan ................. 53-112242

[51] Int. Cl.³ .............................. F01D 5/18
[52] U.S. Cl. ................. 416/97 R; 416/96 R
[58] Field of Search .......... 416/92, 96 R, 96 A, 416/97 R; 62/5

[56] References Cited

U.S. PATENT DOCUMENTS

| | | | |
|---|---|---|---|
| 1,952,281 | 3/1934 | Ranque | 62/5 |
| 2,915,279 | 12/1959 | Chamberlin | 416/97 R |
| 3,111,302 | 11/1963 | Bowmer | 416/97 R |
| 3,656,863 | 4/1972 | De Feo | 416/97 A |
| 3,807,892 | 4/1974 | Frei et al. | 416/97 R |
| 3,864,058 | 2/1975 | Womack | 416/97 R |

FOREIGN PATENT DOCUMENTS 853534 10/1952 Fed. Rep. of Germany ........ 416/97

*Primary Examiner*—Leonard E. Smith
*Attorney, Agent, or Firm*—Craig and Antonelli

[57] ABSTRACT

A blade cooling construction comprising a cylindrical hollow and a nozzle, both of which are defined in and by the blade. The hollow and nozzle create a vortex of cooling gas introduced into the blade, which gas whirls about the axis of the hollow by tangentially injecting the cooling gas into the hollow through the nozzle. A portion of the cooling gas is lowered in temperature, and the other portion is raised in temperature. The lower temperature cooling gas is introduced first to a central portion of the blade height which is higher in temperature than the remaining portions of the blade. The higher temperature cooling gas is introduced to a lower temperature portion of the blade.

10 Claims, 6 Drawing Figures

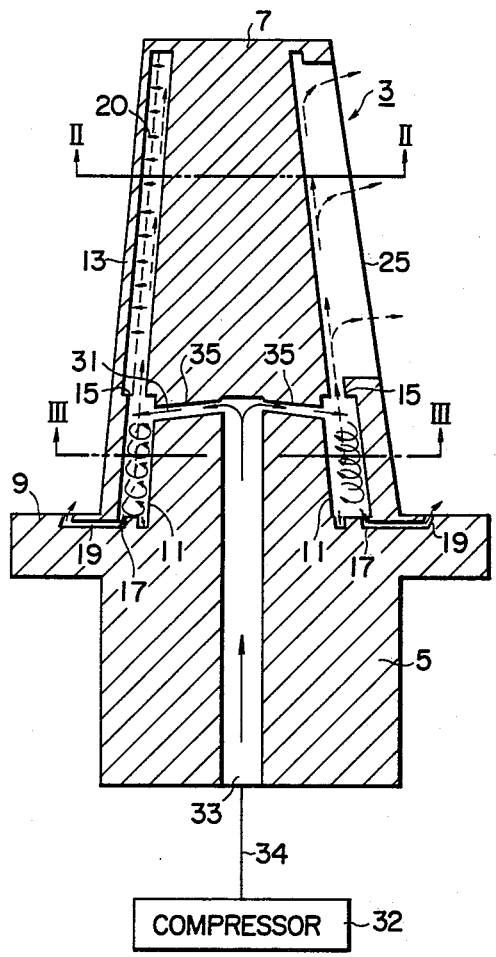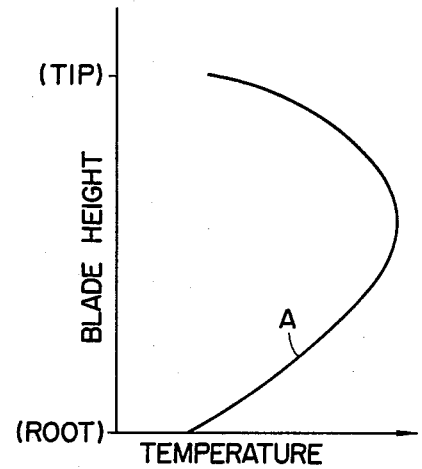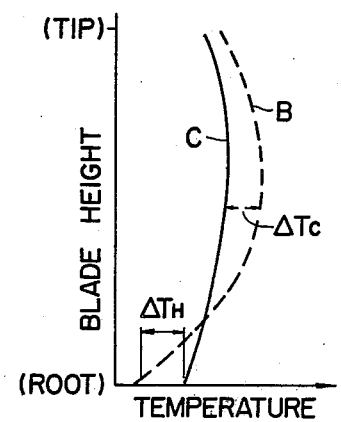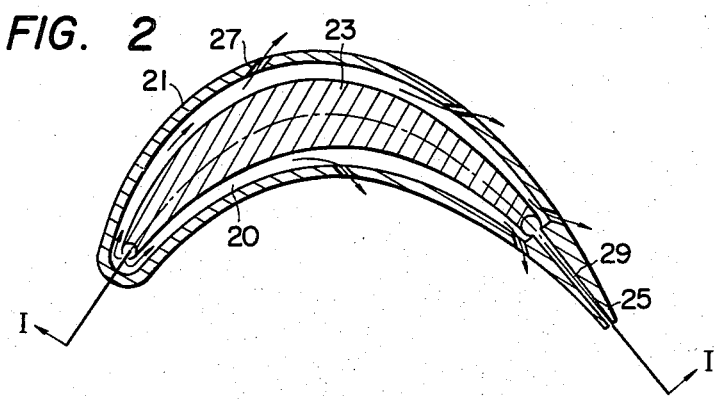

GAS TURBINE BLADE COOLING STRUCTURE

BACKGROUND OF THE INVENTION

The present invention relates to a gas turbine blade cooling structure, and, more particularly, to a gas turbine blade cooling construction suitable for cooling the blade with an air bled from a compressor.

Thermal efficiencies of a gas turbine can be increased by elevating the temperature of a motive gas or a combustion gas directed to the blade. The inlet gas temperature has been raised by about 300° C. during the last ten years due to progress in cooling techniques and to developments of heat-resistant material. In particular, significant progress in cooling techniques has contributed to the elevation of the inlet gas temperature.

In conventional cooling methods, however, the blade to be cooled has an nonuniform distribution of temperature, that is, the temperature is highest at the central portion of the blade height, and becomes lower away from the central portion. Therefore, the blade has a large temperature differential between its central portion, its tip, and its root. This differential is due to heat transfer carried out between the combustion gas and a dilution gas, a material defining gas passages for the motive gas, etc. As a result, the motive gas becomes higher in temperature in the central portion of the blade height and lower in temperature in the other portions. This temperature distribution is parabolical. The blade is influenced greatly by the parabolical temperature distribution of the motive gas and, thus, it has a large temperature differential. This temperature differential is not desirable because thermal stresses are thereby induced in the blade with the result that fatigue and breakage of the blade take place and a long blade life cannot be expected.

The central portion of the blade is weaker in strength because it is subjected to the highest temperature combustion gas and has relatively large stresses due to centrifugal force occurring during the blade rotation. Therefore, in order to make it stronger, it is necessary effectively to lower the temperature at the central portion of the blade in view of blade design without lowering the thermal efficiencies.

An example of a prior art gas cooled turbine blade is shown in Japanese Patent Publication No. 48-24084. The applicants herein have also filed a copending patent application entitled "Gas Cooled Turbine Blade" filed on July 10, 1979 and given Ser. No. 056,225.

SUMMARY OF THE INVENTION

An object of the present invention is to provide a gas turbine blade cooling construction which cools higher temperature portions of the blade effectively with a cooling air bled from a compressor.

Another object of the present invention is to provide a gas turbine blade cooling construction by which the blade has a more uniform temperature distribution from the root portion toward the tip.

A further object of the present invention is to provide a gas turbine blade cooling construction in which blade life and reliability can be raised by cooling the blade more uniformly.

Briefly stated, the present invention involves a blade structure wherein a higher temperature blade portion is cooled by a lower temperature cooling gas whose temperature is lowered by whirling a cooling gas introduced into the blade. For example, according to one embodiment the whirling of the cooling gas is carried out by means of a cylindrical hollow and a nozzle, each of which is provided within and defined by the blade. The nozzle is arranged such that the cooling gas from the nozzle is tangentially injected into the cylindrical hollow to cause in the gas vortexes whirling in the cylindrical hollow. When the peripheral portion of the vortex, which is higher in pressure, is partially transferred to a central portion of the vortex, which is lower in pressure, part of the cooling gas expands and is lowered in temperature. The lowered temperature cooling gas is then introduced into a higher temperature portion of the blade to cool the higher temperature portion as above-mentioned. Thus, according to the present invention, the higher temperature portion is cooled by the lower temperature cooling gas. Therefore, a cooling effect can be achieved at the higher temperature portion.

BRIEF DESCRIPTION OF THE DRAWINGS

These and other features, objects, and advantages will become more apparent from the following description when taken in conjunction with the accompanying drawings in which:

FIG. 1 is a sectional view of an embodiment of a blade cooling structure according to the present invention;

FIG. 2 is a sectional view taken along a line II—II of FIG. 1;

FIG. 4 is a graph showing a temperature distribution of a combustion gas plotted against blade height;

FIG. 5 is a graph showing temperature distributions of two types of blades, one of which (the solid line) has a cooling structure according to the present invention and the other of which (the dashed lines) has a conventional cooling structure.

DESCRIPTION OF THE PREFERRED EMBODIMENTS

Figure 3:
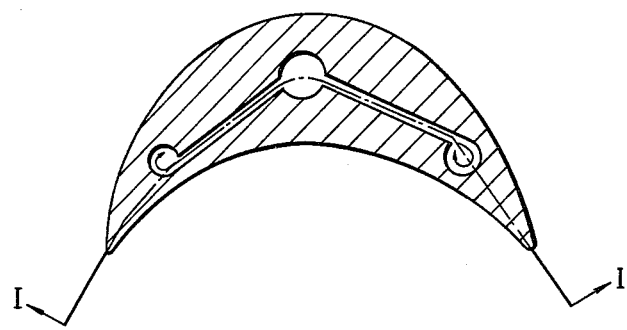
FIG. 3 is a sectional view taken along a line III—III of FIG. 1.

Referring to FIGS. 1 to 3, one embodiment of a cooling construction of a gas turbine blade according to the present invention will be described hereinafter in detail.

FIG. 1 shows a sectional elevation view of a gas turbine blade 3 taken along a line I—I of FIGS. 2 and 3. The blade 3 extends from a root portion 5 to the tip portion 7. In the root portion 5, a flange-shaped platform 9 is included. Cylindrical hollows 11 are formed within the blade 3 and extend from the platform 9 toward the tip 7 along leading and trailing edge 13, 25, respectively. In the end of each of the cylindrical hollows 11 on the tip side an air outlet 15 is provided which is a restriction formed near the axis of the cylindrical hollow 11. In the end of each of the cylindrical hollows 11 on the platform side, there is an annular outlet 17 which is formed at or near the inner cylindrical face of the cylindrical hollow 11. The annular outlet 17 communicates with an air passage 19 which is opened to the surface of the blade 3 at the platform 9. Between the restriction 15 and the tip 7, a space 20 defined by a side wall 21 and a blade core 23 is formed from the leading edge 13 toward the trailing edge 25, as best shown in FIG. 2. The restrictions 15 open to the space 20 which communicates with the outside of the blade 3 through a plurality of holes 27 and a slit 29 at the trailing edge 25. Nozzle 31 are provided for the cylindrical hollows 11 so that an air flows tangentially into the cylindrical hollows 11, as shown in FIG. 3. The nozzles 31 each are fluidly connected with a header 33 through an air passage 35. The header 33 communicates with a compressor 32 through air passage 34 (schematically shown).

In this embodiment of a blade cooling construction, a cooling air is bled from the compressor 32 and is injected into the cylindrical hollow 11 through the header 33, the air passage 35, and the nozzle 31. The cooling air injected is caused to form whirling vortexes about the axis of the cylindrical hollow 11 at a high speed. The vortexed cooling air, which flows toward the root portion 5 while whirling in the cylindrical hollow 11, becomes higher in pressure at its outer peripheral portion and lower in pressure toward its axis. As a result, the cooling air in the cylindrical hollow 11 has a large pressure gradient. A portion of the higher pressure cooling air flows toward the axis and, at the same time, expands. Upon expansion, the cooling air is lowered in temperature by $\Delta T_C$. The lower temperature cooling air flows toward the tip 7, enters the space 20, and runs out of the space through the plurality of holes 27 and the slit 29 while running toward the tip 7 and the trailing edge 25 respectively.

The remaining portion of the cooling air flows along the inner face of the cylindrical hollow 11 and out of the blade 3 through the annular outlet 17 and the air passage 19, whereby the platform 9 is cooled. Since the cooling air passing through the annular outlet 17 is compressed by centrifugal force due to the rotation of the air its pressure increases, thereby being elevating its temperature by $\Delta T_H$. The temperature increase $\Delta T_H$ corresponds to the amount of energy which the lower temperature cooling air released when cooled by $\Delta T_C$.

The lower temperature cooling air which left the restriction 15 first cools higher portions of the blade 3, that is, the central portion of the blade 3, and then flows toward the tip 7 and the trailing edge 25, whereby cooling the other part of the blade 3. The lower temperature cooling air from the restriction 15 is partially jetted from the holes 27 to spread over the surface of the side wall 13 so that the heat transfer of a motive gas or a combustion gas to the surface will be limited. In this case, the lower temperature cooling air is jetted from holes 27 at the higher temperature portion of the blade 3, that is, the central portion of the blade 3 with respect to the height. The cooling air from the holes 27 at the other portions is raised in temperature because of heat transfer between the air and the inner face of the side wall 13 and the blade core 23. Therefore, higher portions of the blade 3 are cooled effectively, so that a temperature distribution becomes more uniform over the blade height.

The temperature distribution of a blade cooled by this embodiment according to the invention, as compared with a conventional cooling method, will be described with reference to FIGS. 4 and 5.

In FIG. 4, curve A shows the temperature distribution of a combustion gas in relation to the height of the blade 3. The gas temperature is lower at the root 5 of the blade 3, is higher at a central portion of the blade 3, and is lower at the tip 7. When a blade, which is heated by a combustion gas having a temperature distribution as shown by the curve A in FIG. 4, is cooled by conventional cooling constructions it has a temperature distribution of the type shown by a curve B in FIG. 5.

However, a blade 3 which is cooled by a construction in accordance with the present invention has a temperature distribution shown by a curve C in FIG. 5. This objective is achieved because cooling air which is reduced in temperature by $\Delta T_C$ flows in a higher temperature portion of the blade 3 and then the blade 3 is lowered in temperature by $\Delta T_C$ at the highest temperature surface of the blade, as compared with conventional cooling as shown in FIG. 5. Since the root portion or platform 9, which encounters lower temperature combustion gas, is cooled by or in heat exchange relationship with the higher temperature cooling air, the surface of the root portion is raised by $\Delta T_H$ as compared with conventional cooling as shown in FIG. 5. Therefore, the blade 3 is cooled in a novel manner to achieve more uniform temperature distribution.

For example, assuming that a ratio $(P_i/P_o)$ of pressure at a blade inlet to that at a blade outlet, and a ratio $(G_c/G_r)$ of an amount $G_c$ of cooling air lowered in temperature by $(\Delta T_C)$ to the total amount $G_r$ of the cooling air are 2 and 0.7, respectively, the cooling air is lowered in temperature by about 45° C. $(\Delta T_C)$, and raised by about 30° C. $(\Delta T_H)$. The temperature limit of the material used for blades at present is 950° C. in stationary vanes, and 900° C. in moving blades. The strength of the material constituting the blade subject to such a high temperature can be raised by 30 to 40 percent (%) if the temperature of the blade is lowered by 50° C.

According to the present invention, the temperature distribution in the height direction of the blade, that is, from the root portion 5 toward the tip 7, is made more uniform than by conventional cooling techniques. Therefore, the fatigue or failure due to thermal stress is greatly reduced, and the blade can have a longer life. The temperature of the central portion of the blade is reduced by $\Delta T_C$ as compared with a conventionally cooled blade and is thus stronger, has longer life, and has higher reliability. Furthermore, if a portion of the blade becomes particularly high in temperature, as in conventional blades, the turbine inlet temperature is determined by the temperature in the "hot spot" portion which has a particularly high temperature. However, the blade according to the present invention does not have a "hot spot" portion therein, so that the turbine inlet temperature can be further elevated with the result of a higher thermal efficiency.

Figure 6:
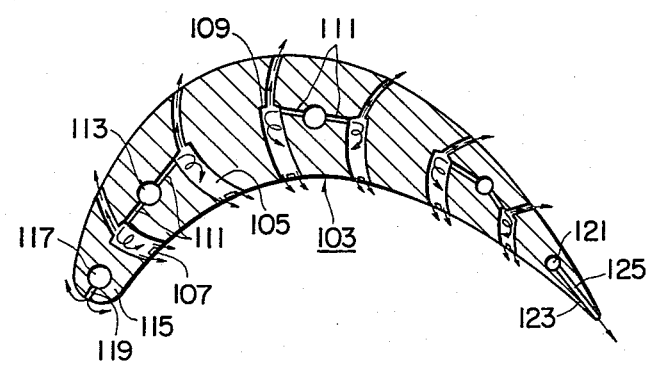
FIG. 6 is a sectional view of another embodiment of a blade cooling construction according to the present invention.

Referring now to the further embodiment shown in FIG. 6, a blade 103 is provided with a plurality of cylindrical hollows 105 therewithin. The cylindrical hollows 105 each have an annular outlet 107 which is opened to the belly side or underside of blade 103 and a restriction 109 at the opposite end of the annular outlet 107. The outer diameter of annular outlet 107 is the same as the diameter of the cylindrical hollow 105. The restriction 109 is an air passage having a diameter smaller than the cylindrical hollow 105 and opened to the backside of the blade 103. The cylindrical hollows 105 are each further provided with a nozzle 111 tangentially connected thereto. The nozzle 111 is connected with a header 113 which is extended inside the blade 103 from the root of the blade 103. In the leading edge 115, an air hole 117 is formed so as to extend from the root toward the tip. The air hole 117 communicates with the outside of the leading edge 115 through a plurality of fine (small) air holes 119 formed perpendicular to the air hole 117. In the trailing portion 123, a hole 121 extending from the root toward the tip is formed. The hole 121 communicates with the outside of the blade 103 through a slit 125.

In this embodiment of the novel cooling construction, a cooling air bled from a compressor (not shown) is injected tangentially into the cylindrical hollow 105 by the nozzle 111 through the header 113. The injected cooling air is whirled at high speed and is vortexed. A peripheral portion of the vortexes is raised in temperature and is jetted from the annular outlet 107 to cool the belly side. The central portion of the vortexes is lowered in temperature as above-mentioned and is jetted from the restriction 109 to cool the backside. The leading edge 123 is cooled by a cooling air jetted through the plurality of fine holes 119, and the trailing edge by a cooling air jetted through the slit 123.

Generally speaking, in a gas turbine blade the temperature at the surface of the backside is higher than the temperature at the surface of the belly side because heat convection efficiency at the back side is larger than at the belly side. In the embodiment of FIG. 6, a lower temperature cooling air is introduced into the backside whose surface has a higher temperature, so as to cool the higher temperature surface of the blade 103 more effectively. Further, the lower temperature surface of the blade 103 is cooled by the higher temperature cooling gas. Therefore, the temperature distribution of the blade 103 is made more uniform than by conventional cooling. Thermal stresses induced in the blade 103 are thus smaller, and a longer life can be expected. In addition since the maximum temperature of the blade 3 is reduced by effective cooling, a higher temperature motive gas can be used.

According to the present invention, a higher temperature portion of a blade is cooled by a lower temperature portion of cooling air bled from a compressor so that the blade can be effectively cooled at its higher temperature portion. While we have shown several preferred embodiments in accordance with our invention, it is to be clearly understood that the same is susceptible of numerous changes and modifications without departing from the scope of the present invention. We, therefore, do not wish to be limited solely to the details shown and described herein but intend to cover all such changes and modifications as are encompassed by the appended claims.

What is claimed is:

1. A turbine blade comprising:
   vortex means within the blade for whirling a cooling medium to make a portion of the cooling medium lower in temperature and the other portion of the cooling medium higher in temperature;
   first passage means communicating with said vortex means for introducing the cooling medium into the blade;
   second passage means communicating with said vortex means for leading the lower temperature cooling medium to a higher temperature portion of the blade; and
   third passage means communicating with said vortex means for leading the higher temperature cooling gas to a lower temperature portion of the blade.

2. The turbine blade according to claim 1, wherein the cooling medium is gas bled from a compressor and introduced into the blade through said first passage means.

3. The turbine blade according to claim 1, wherein said vortex means comprises a cylindrical hollow formed in the blade and a nozzle arranged such that the cooling medium from said nozzle will be tangentially injected into said cylindrical hollow, said cylindrical hollow having two gas outlets, one of which outlets discharges the lower temperature cooling medium therethrough and the other of which outlets discharges the higher temperature cooling medium therethrough.

4. The turbine blade according to claim 2, wherein said blade has a platform, and said gas outlet for the higher temperature cooling medium is connected to said third passage which is opened to the outside at the blade platform.

5. The turbine blade according to claim 3, wherein said gas outlet for the lower temperature cooling medium is connected to said second passage means.

6. The turbine blade according to claim 5, wherein said gas outlet for the higher temperature cooling medium is connected to said third passage means.

7. The turbine blade according to claim 6, wherein the axis of said cylindrical hollow extends from the backside of the blade to the underside of the blade, and said gas outlet for the lower temperature cooling medium and said gas outlet for the higher temperature cooling medium are provided at the backside of the blade and at the underside of the blade, respectively.

8. A turbine blade comprising:
   a plurality of means within the blade for whirling a cooling medium introduced into the blade and making a portion of the cooling medium lower in temperature and the remaining portion of the cooling medium higher in temperature, said plurality of means each including a cylindrical hollow, the axis of which is directed from a root of the blade toward a tip of the blade, a nozzle connected to said hollow such that the cooling medium is tangentially injected into said hollow, an air restriction for discharging the lower temperature portion of the cooling medium, and an outlet for discharging the higher temperature portion of the cooling medium;
   passage means for introducing the cooling medium into the whirling means so that said nozzle injecting the cooling medium into the cylindrical hollow creates vortexes;
   a space formed within and along a side face of the blade between the tip of blade and said whirling means, said space communicating with said lower temperature cooling medium discharge outlets of said whirling means such that a portion of the lower temperature cooling medium in said whirling means will enter said space through said discharge outlets;
   a plurality of holes formed in the side face of the blade for discharging the cooling medium in said space out of the blade; and
   a plurality of higher temperature cooling medium passage means formed in the blade for leading a part of the higher temperature cooling medium in said whirling means to near the root of blade and discharging that higher temperature cooling medium from the root of blade therethrough.

9. The turbine blade according to claim 8, wherein the cooling medium is air bled from a compressor and introduced into the blade through the passage means.

10. The turbine blade according to claim 8, wherein one of said whirling means is located at the leading edge of the blade and another whirling means is located at the trailing of the blade.

* * * * *